Figure 1:
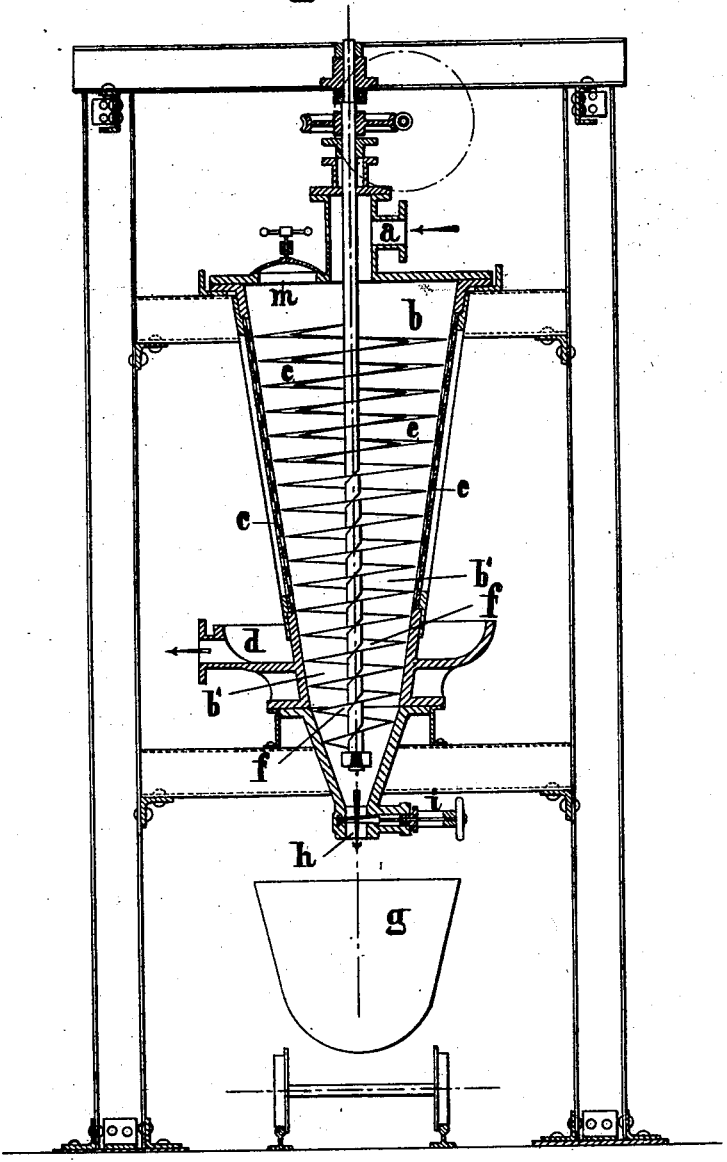

No. 722,632. PATENTED MAR. 10, 1903.
F. ROTHE.
FILTER.
APPLICATION FILED JULY 22, 1902.
NO MODEL. 2 SHEETS—SHEET 1.

Witnesses.

Inventor.
Fritz Rothe.
By James L. Norris.
Atty.

No. 722,632. PATENTED MAR. 10, 1903.
F. ROTHE.
FILTER.
APPLICATION FILED JULY 22, 1902.
NO MODEL. 2 SHEETS—SHEET 2.

Witnesses. Inventor.
Fritz Rothe.
By James L. Norris.
Atty.

UNITED STATES PATENT OFFICE.

FRITZ ROTHE, OF BILLWÄRDER, GERMANY.

FILTER.

SPECIFICATION forming part of Letters Patent No. 722,632, dated March 10, 1903.

Application filed July 22, 1902. Serial No. 116,592. (No model.)

*To all whom it may concern:*

Be it known that I, FRITZ ROTHE, a subject of the Emperor of Germany, residing at Billwärder, Germany, have invented certain new and useful Improvements in Filters, of which the following is a specification.

This invention relates to a filter which works continuously and automatically discharges the solid constituents filtered off. The filter is designed to serve as a substitute for the known filter-presses or filter-pumps, more especially in cases where it is desired to separate large quantities of the solid constituents of the liquid. For this reason the working of a filter-press is always very expensive, on the one hand, by reason of its constantly requiring manual labor and, on the other hand, by reason of the large number of filter-cloths used. Also the known filter-pumps (vacuum or suction filters) are too expensive in working for this purpose, and similarly the allowing to settle of large quantities of sediment or precipitate in settling-tanks and the like and the removal of the deposited mud or sediment is a tedious and costly operation. The filter forming the subject of this invention, however, permits solid constituents to be separated from the liquid with a minimum of attendance and working expenses. In this arrangement, moreover, the solid constituents are obtained in a condition suitable for storage or transport. The filter is very suitable for use in cases where large quantities of mostly valueless precipitates or sediments are to be separated from liquid in order to render them suitable for storage and transport—for example, in the cleaning of effluent water from manufactories and towns, in the manufacture of caustic soda for filtering off the corbonate of lime, in the manufacture of spirits of harsthorn, (ammonia,) for the filtering off of the lime-sludge from the distilling-columns, which is now generally brought into settling-tanks for the deposition of the solid matter, and for like purposes.

The essential feature of my improved filtering apparatus consists in that in order to obtain economical working the filtered-off solid constituents are automatically discharged from the filter in order to obviate manual labor. This is effected by making the filter open at one end and by using as a stopper during filtering a plug made of the pressed-out material itself. This plug prevents the escape of liquid at this place and is itself forcibly removed from the apparatus by a screw conveyer or worm.

I will now describe two forms of construction of my improved filter by way of example, with reference to the accompanying drawings, which are vertical central sections.

The liquid to be filtered enters through a flanged inlet $a$, Figure 1, into the filter-chamber $b$, which is provided with a filtering-surface $c$, preferably made in the form of a conical casing of perforated sheet metal with an insertion of filtering-cloth. By the pressure of a pump (or pressure vessel) moving the liquid the said liquid filters through and drops into an external cup or tray $d$, from whence it runs away. The solid constituents deposit on the inner surface of the filter $c$ and are scraped off by a slowly-rotating conveyer-screw $e$, whereby they are fed downward and collected in the lower narrow part $b'$ of the conical apparatus. Here they form a plastic plug which prevents the escape of the liquid. The helical blade forming the conveyer-screw in the upper part $b$ of the filter is extended in this part of the apparatus into a complete worm $f$, which in its rotation feeds the plastic plug of material out of the apparatus at $h$, for example, directly into a railway-truck $g$. Since the consistency of this plug is dependent on the pressure in the filter, a simple gate or like valve $i$ is arranged at the outlet $h$, so that it is possible by adjusting the speed of rotation of the helical blade and worm and by suitably enlarging or contracting the cross-section of the outlet-opening $h$ by means of the valve or slide $i$ to work the filter continuously in such a manner as to allow the filtered-off solid constituents to leave the filter continuously at $h$ as a more or less plastic mass. If thus the speed of rotation of the conveyer screw or worm and the cross-section at the outlet $h$ be once adjusted to the existing conditions, (duty of the pump, nature of the material, &c.,) the apparatus will continue to work without further attention and the only manual labor consists in pushing under a fresh truck, provided that mechanical transporting arrangements are not provided in a known manner. Obviously the filter can also be worked periodically by intermittently closing the valve *i* at the outlet.

In setting the apparatus in operation the valve *i* is either entirely closed for a short time until a plug has formed or plastic material—for example, clay—for forming a plug can be introduced through a manhole *m* for filling the space *b'* near the outlet.

Figure 2:
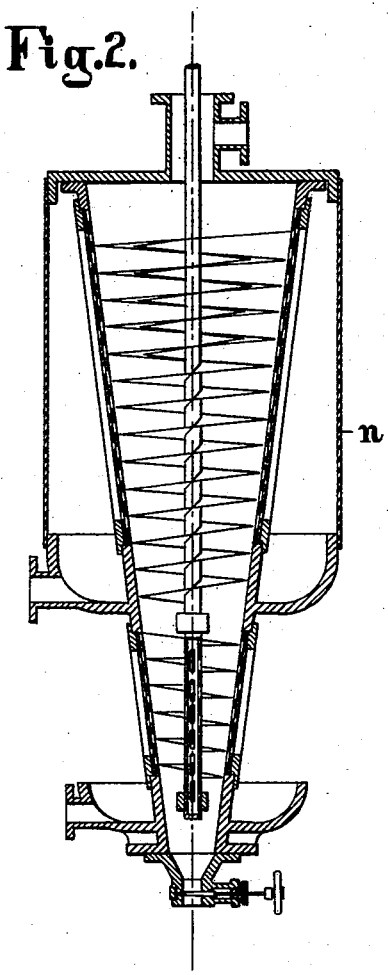

The apparatus can also be employed as a vacuum-filter, in which arrangement the filtering-surface is surrounded with a closed casing *n*, Fig. 2. This arrangement also permits the apparatus to be used at the same time as a pressure and suction filter.

Moreover, the apparatus permits the washing of the filtered-off constituents. For this purpose the shaft of the helical blade and worm is made hollow and is provided with lateral openings, Fig. 2. The casing around the lower conveyer screw or worm is preferably provided with an additional filtering-surface and collecting cup or tray on the exterior. By this means water or washing liquid can be pressed or drawn through the mass.

What I claim is—

1. A filter comprising a casing, permeable walls forming part of said casing, an inlet in said casing, an outlet in said casing, a rotating shaft in said casing, a helical blade carried by said shaft, the helices of said blade being separated from said shaft for a predetermined distance, so as to provide a central opening around said shaft, and a screw conveyer carried by said shaft.

2. A filter comprising a casing, an inlet in said casing, an outlet in said casing, upper permeable walls in said casing, lower permeable walls in said casing, a rotating shaft in said casing, a helical blade carried by said shaft adjacent to said upper permeable walls, the helices of said blade being separated from said shaft for a predetermined distance, so as to provide a central opening around said shaft, a screw conveyer carried by said shaft adjacent to said lower permeable walls, means for conveying away the material filtered through said upper permeable walls, and means for conveying away the material filtered through said lower permeable walls.

3. A filter comprising an inner casing, upper and lower permeable walls in said casing, an inlet in said casing, an outlet in said casing, a conveyer in said casing, an outer casing surrounding said inner casing adjacent to said upper permeable wall, and an independent outer casing surrounding said inner casing adjacent to said lower permeable wall.

4. A filter comprising a casing, upper and lower permeable walls in said casing, an inlet in said casing, an outlet in said casing, a two-part conveyer in said casing, said conveyer consisting of a helical blade adapted to operate adjacent to said upper permeable wall and a solid screw conveyer adapted to operate adjacent to said lower permeable wall, and a hollow shaft for said conveyer, said shaft being provided with lateral apertures adjacent to said solid screw conveyer.

5. A filter comprising a casing, upper and lower permeable walls in said casing, an inlet in said casing, an outlet in said casing, a two-part conveyer in said casing, said conveyer consisting of a helical blade adapted to operate adjacent to said upper permeable wall and a solid screw conveyer adapted to operate adjacent to said lower permeable wall, a hollow shaft for said conveyer, said shaft being provided with lateral apertures adjacent to said solid screw conveyer, means for conveying away the material filtered through said upper permeable wall, and means for conveying away the material filtered through said lower permeable wall.

6. A filter comprising a casing, upper and lower permeable walls in said casing, an inlet in said casing, an outlet in said casing, means for controlling said outlet a two-part conveyer in said casing, said conveyer consisting of a helical blade adapted to operate adjacent to said upper permeable wall, and a solid screw conveyer adapted to operate adjacent to said lower permeable wall, a hollow shaft for said conveyer, said shaft being provided with lateral apertures adjacent to said solid screw conveyer, means for conveying away the material filtered through said upper permeable wall, and means for conveying away the material filtered through said lower permeable wall.

7. A filter comprising an inner casing, upper and lower permeable walls in said casing, an inlet in said casing, an outlet in said casing, means for controlling said outlet, a manhole in said casing, a two-part conveyer in said casing, said conveyer consisting of a helical blade adapted to operate adjacent to said upper permeable wall, and a solid screw conveyer adapted to operate adjacent to said lower permeable wall, a hollow shaft for said conveyer, said shaft being provided with lateral apertures adjacent to said solid screw conveyer, an outer casing surrounding said inner casing adjacent to said upper permeable wall, and an independent outer casing surrounding said inner casing adjacent to said lower permeable wall.

In testimony whereof I have hereunto set my hand in presence of two subscribing witnesses.

FRITZ ROTHE.

Witnesses:
E. H. L. MUMMENHOFF,
O. W. HELLENROTH.